United States Patent [19]

Hert et al.

[11] Patent Number: 5,191,050
[45] Date of Patent: Mar. 2, 1993

[54] FUNCTIONALIZED ETHYLENE POLYMERS USEFUL FOR METAL COATING, AND PROCESS FOR THEIR PREPARATION

[75] Inventors: Marius Hert, Verneuil en Halatte; Brigitte Labatut; Jean Lebez, both of Lens, all of France

[73] Assignee: Norsolor, France

[21] Appl. No.: 729,789

[22] Filed: Jul. 10, 1991

Related U.S. Application Data

[63] Continuation of Ser. No. 601,005, Oct. 22, 1990, abandoned, which is a continuation of Ser. No. 257,591, Oct. 14, 1988, abandoned.

[30] Foreign Application Priority Data

Oct. 14, 1987 [FR] France ............................... 87-14183

[51] Int. Cl.$^5$ ............................................ C08F 222/04
[52] U.S. Cl. .................................... 526/272; 526/321; 526/323.2; 526/329
[58] Field of Search .............. 526/272, 321, 323.2, 526/329

[56] References Cited

U.S. PATENT DOCUMENTS

| | | | |
|---|---|---|---|
| 3,387,022 | 6/1968 | Hagemyer et al. ............... | 526/321 |
| 3,663,467 | 5/1972 | Albright et al. ................. | 526/321 |
| 4,472,475 | 12/1984 | Decroix ........................... | 428/215 |
| 4,617,366 | 10/1986 | Gloriod et al. .................. | 526/272 |

FOREIGN PATENT DOCUMENTS

| | | | |
|---|---|---|---|
| 3444094A | 12/1986 | Fed. Rep. of Germany ...... | 526/272 |
| 2498609 | 1/1981 | France . | |
| 2505859 | 5/1981 | France . | |

OTHER PUBLICATIONS

Hawley's Condensed Chemical Dictionary, 11th Edition, p. 738, (1987).
Kirk Othmer, "Concise Encyclopedia of Chemical Technology" p. 934, (1985).

*Primary Examiner*—Joseph L. Schofer
*Assistant Examiner*—Alex H. Walker
*Attorney, Agent, or Firm*—Finnegan, Henderson, Farabow, Garrett & Dunner

[57] ABSTRACT

Polymers of melt index between 1 and 20 dg/min, which comprise units (A) derived from ethylene, units (B) derived from an ethylenically unsaturated $\alpha,\beta$-dicarboxylic acid anhydride and, where appropriate, units (C) derived from an alkyl acrylate or methacrylate in which the alkyl group contains from 1 to 12 carbon atoms, characterized in that, per 100 moles, they comprise: from 83 to 99.7 moles of units (A), from 0.29 to 3 moles of units (B), from 0 to 13.6 moles of units (C) and, furthermore, from 0.01 to 0.4 moles of units (D) derived from at least one polyol polyacrylate or polymethacrylate.

Their process of preparation consists of copolymerizing a mixture of ethylene, an anhydride of an ethylenically unsaturated $\alpha,\beta$-dicarboxylic acid, at least one polyol polyacrylate or polymethacrylate and, where appropriate, at least one alkyl acrylate or methacrylate, at a temperature of between 140° and 280° C., under a pressure of between 1,000 and 2,500 bars, in the pressure of at least one free radical initiator, and is characterized in that the polyol polyacrylate or polymethacrylate is dissolved in a solvent prior to the copolymerization.

6 Claims, No Drawings

FUNCTIONALIZED ETHYLENE POLYMERS USEFUL FOR METAL COATING, AND PROCESS FOR THEIR PREPARATION

This application is a continuation of pending prior application Ser. No. 07/601,005 filed Oct. 22, 1990, now abandoned which is a continuation of prior application Ser. No. 07/257,591 filed Oct. 14, 1988 now abandoned.

BACKGROUND OF THE INVENTION

The present invention relates to functionalized ethylene polymers useful for metal coating, and to a process for their preparation.

There are already known, from the document FR-A-2,498,609, polymers comprising from 87 to 98.7 mol % of units derived from ethylene, from 1 to 10 mol % of units derived from an alkyl acrylate or methacrylate in which the alkyl group has from 1 to 6 carbon atoms, and from 0.3 to 3 mol % of units derived from maleic anhydride. In accordance with the document FR-A-2,505,859, these polymers, if their melt index is between 2 and 10 dg/min, are useful for metal coating in the form of a film which is between 10 and 500 μm thick. In this way, materials which have good peel resistance are obtained. However, during this operation they exhibit a rather great neck-in phenomenon, which makes it difficult to run the coating machine. The neck-in is defined as the ratio of the difference (width of the die-width of the film) to the width of the die.

SUMMARY OF THE INVENTION

The problem which the present invention proposes to solve consists of developing polymers which, when applied to metal coating, are capable of giving satisfactory peel resistance, while reducing the neck-in phenomenon.

A first subject of the present invention is polymers of melt index between 1 and 20 dg/min, which comprise units (A) derived from ethylene, units (B) derived from an ethylenically unsaturated α,β-dicarboxylic acid anhydride and, where appropriate, units (C) derived from an alkyl acrylate or methacrylate in which the alkyl group contains from 1 to 12 carbon atoms, characterized in that, per 100 moles, they comprise from 83 to 99.7 moles of units (A), from 0.29 to 3 moles of units (B), from 0 to 13.6 moles of units (C) and furthermore from 0.01 to 0.4 moles of units (D) derived from at least one polyol polyacrylate or polymethacrylate.

A second subject of the present invention is a process for the preparation of the polymers defined above by copolymerization of ethylene, an anhydride of an ethylenically unsaturated α,β-dicarboxylic acid, at least one polyol polyacrylate or polymethacrylate and, where appropriate, at least one alkyl acrylate or methacrylate, at a temperature T of, approximately, between 140° and 280° C., under a pressure P of, approximately, between 1,000 and 2,500 bars, in the presence of at least one free radical initiator, characterized in that, prior to the copolymerization, the polyol polyacrylate or polymethacrylate is dissolved in a solvent.

A third subject of the present invention relates to a composite material comprising at least one layer of metal coated with at least one polymer film layer as described above, and of thickness between 5 and 500 μm.

Additional objects and advantages of the invention will be set forth in part in the description that follows, and in part will be obvious from the description or may be learned by practice of the invention. The objects and advantages of the invention may be realized and attained by means of the procedures and combinations particularly pointed out in the appended claims.

DESCRIPTION OF THE PREFERRED EMBODIMENTS

A first subject of the present invention is polymers of melt index between 1 and 20 dg/min, which comprise units (A) derived from ethylene, units (B) derived from an ethylenically unsaturated α,β-dicarboxylic acid anhydride and, where appropriate, units (C) derived from an alkyl acrylate or methacrylate in which the alkyl group contains from 1 to 12 carbon atoms, characterized in that, per 100 moles, they comprise from 83 to 99.7 moles of units (A), from 0.29 to 3 moles of units (B), from 0 to 13.6 moles of units (C) and furthermore from 0.01 to 0.4 moles of units (D) derived from at least one polyol polyacrylate or polymethacrylate.

The melt index of the polymers according to the invention is determined in accordance with standard specification ASTM D-1238 at 190° C. under a load of 2.16 kg. It is preferably between 1 and 8 dg/min. Their crystalline melting point is generally between 70° and 110° C. and their Vicat softening point is generally between, approximately, 40° and 90° C. The crystalline melting points and the Vicat softening point are the lower, the higher the content of units (C).

The polymers according to the invention generally have a weight-average molecular weight of 50,000 to 150,000 and/or a polydispersity index (defined as the ratio of the weight-average molecular weight to the number-average molecular weight) of, approximately, between 5 and 12.

The polymers according to the invention have, preferably, a content of units (C) that is not equal to zero. The presence of units derived from an alkylacrylate or methacrylate allows the cristallinity ratio of the polymer obtained to be lowered, and to facilitate the welding of films containing the polymer. Advantageously the polymers according to the invention then comprise, per 100 moles: from 83 to 98.7 moles of units (A), from 0.29 to 3 moles of units (B), from 1 to 13.6 moles of units (C) and from 0.01 to 0.4 moles of units (D).

By polyol polyacrylate or polymethacrylate involved in the structure of the polymers according to the invention there is understood any compound derived from a polyol and comprising at least two ester groups, obtained by at least partial esterification of the said polyol with acrylic or methacrylic acid. The compound can be a diacrylate or dimethacrylate of a diol, triol, tetrol etc., a triacrylate or trimethacrylate of a triol, tetrol etc., or a tetraacrylate or tetramethacrylate of a polyol having at least 4 alcohol groups. There may be mentioned the diacrylates and dimethacrylates of ethylene glycol, propylene glycol, 1,3-butanediol, 1,4-butanediol, 1,6-hexanediol, neo-pentylglycol, 1,4-cyclohexanediol, 1,4-cyclohexanedimethanol, 2,2,4-trimethyl-1,3-pentanediol, 2-ethyl-2-methyl-1,3-propanediol, 2,2-diethyl-1,3-propanediol, diethylene glycol, dipropylene glycol, triethylene glycol, tripropylene glycol, tetraethylene glycol, tetrapropylene glycol, trimethylolethane, trimethylolpropane, glycerol or pentaerythritol, the triacrylates and trimethacrylates of trimethylolethane, trimethylolpropane, glycerol or pentaerythritol, the tetraacrylates and tetramethacrylates of pentaerythritol, the diacrylates to hexaacrylates, and the dimethacrylates to hexamethacrylates, of dipentaerythritol, polyacrylates or polymethacrylates of mono- or polyethoxylated, or mono- or polypropoxylated polyols such as triethoxylated trimethylol propane triacrylate and trimethacrylate, tripropoxylated trimethylolpropane triacrylate and trimethacrylate, tripropoxylated glycerol triacrylate and trimethacrylate, tetraethoxylated pentaerythritol triacrylate, trimethacrylate, tetraacrylate and tetramethacrylate.

The alkyl acrylate or methacrylate which can, where appropriate, be present in the structure of the polymers according to the invention is in particular chosen from among methyl, ethyl, n-propyl, iso-propyl, n-butyl, iso-butyl, n-pentyl, n-hexyl, 2-ethylhexyl, n-octyl, 3,5,5-trimethylhexyl, n-decyl and cyclohexyl acrylates and methacrylates. The anhydride of an ethylenically unsaturated $\alpha,\beta$-dicarboxylic acid can in particular be maleic anhydride, citraconic anhydride, itaconic anhydride and their higher alkyl homologues.

A second subject of the present invention is a process for the preparation of the polymers defined above by copolymerization of ethylene, an anhydride of an ethylenically unsaturated $\alpha,\beta$-dicarboxylic acid, at least one polyol polyacrylate or polymethacrylate and, where appropriate, at least one alkyl acrylate or methacrylate, at a temperature T of, approximately, between 140° and 280° C., under a pressure P of, approximately, between 1,000 and 2,500 bars, in the presence of at least one free radical initiator, characterized in that, prior to the copolymerization, the polyol polyacrylate or polymethacrylate is dissolved in a solvent. The process can be carried out batchwise or, advantageously, continuously. In the latter case, the mixture which is subjected to copolymerization and which enters the polymerization reactor consists, in the stationary state, of 97.8 to 99.97 mol % (preferably of 97.8 to 99.87 mol %) of ethylene, 0.029 to 0.35 mol % of an anhydride of an unsaturated $\alpha,\beta$-dicarboxylic acid, of 0 to 1.8 mol % (preferably of 0.1 to 1.8 mol %) of alkyl acrylate or methacrylate and of 0.001 to 0.05 mol % of polyol polyacrylate or polymethacrylate.

The solvent used can be an inert solvent (that is to say a solvent which does not copolymerize under the conditions in which the process according to the invention is carried out) which has a negligible transfer constant relative to ethylene and has a boiling point between 100° and 250° C. Examples of such solvents are propylene carbonate, dimethylformamide etc. The solvent used can, especially in the case where the polymer obtained contains units derived from at least one alkyl acrylate or methacrylate, also be the alkyl acrylate or methacrylate itself. In these solvents, which may or may not be inert, the polyol polyacrylate or polymethacrylate is soluble in all proportions; advantageously, solutions having a concentration of 50 to 500 g/l are used. The polyol polyacrylate or polymethacrylate solution can be introduced directly into the polymerization reactor, that is to say independently of the flow of ethylene.

If the process is carried out in an installation comprising a primary ethylene compressor having a discharge pressure $P_1 < P$ (for example between 200 and 300 bars), connected to a secondary compressor which is connected directly to the polymerization reactor, the polyol polyacrylate or polymethacrylate solution is advantageously introduced into the intake of the secondary compressor.

According to a variant of the process according to the invention, the anhydride of the unsaturated $\alpha,\beta$-dicarboxylic acid is also dissolved, advantageously at a concentration of 50 to 500 g/l, in a solvent as defined above. The solutions of the polyol polyacrylate or polymethacrylate and of the anhydride of the unsaturated $\alpha,\beta$-dicarboxylic acid can be introduced directly into the polymerization reactor or into the intake of the secondary compressor, or one may be introduced into the reactor and the other in the intake of the secondary compressor.

According to an advantageous variant of the process according to the invention, the polyol polyacrylate or polymethacrylate and the anhydride of the unsaturated $\alpha,\beta$-dicarboxylic acid are dissolved in the same solvent to form a single solution which is either introduced directly into the polymerization reactor or into the intake of the secondary compressor.

The polymerization reactor which can be used for carrying out the continuous mode of the process according to the invention can be of the tubular or autoclave type and can comprise one or more zones. In general, the bottom of the reactor is equipped with a relief valve which allows the pressure to be lowered, for example to about 250 bars. The mixture of the molten polymer obtained and of the unreacted monomers passes through the said relief valve and is fed into a separator operating at medium pressure. The polymer is collected at the bottom of the said separator while the unreacted monomers are recycled, after cooling, to the intake of the secondary compressor. The bottom of the medium pressure separator can be equipped with a relief valve connected to a low pressure hopper at the bottom of which the polymer is collected, while the gases coming from the low pressure hopper are recycled to the intake of the primary compressor. As mentioned above, the secondary compressor is connected directly to the polymerization reactor; its discharge pressure is thus equal to that of the reactor, to within any pressure drops.

The free radical initiators which can be used according to the invention are the initiators conventionally used in such high-pressure polymerization processes, for example peroxides, peresters and hydroperoxides. It is thus possible to use 2-ethylhexylperoxydicarbonate, ter-butyl perbenzoate, ter-butyl 2-ethylperhexanoate, and di-ter-butyl, isopropanoyl and 3,5,5-trimethylhexanoyl peroxides.

It is also possible simultaneously to use a plurality of initiators in one and the same zone of the reactor. The choice of the initiator or initiators depends on the polymerization temperature.

It is also possible to carry out the copolymerization by introducing into the reaction mixture a transfer agent, in an amount of, for example, between 0.01 and 0.2% by volume, so as to control the molecular weight and melt index of the polymer obtained. Examples of such transfer agents are hydrogen, alkanes, such as propane and butane, $\alpha$-olefins such as, in particular, propene and 1-butene, aldehydes and ketones.

A third subject of the present invention relates to a composite material comprising at least one layer of metal coated with at least one polymer film layer as described above, and of thickness between 5 and 500 $\mu$m.

The polymer film layer can furthermore be coated with at least one layer of a film of a thermoplastic resin, such as polyethylene, of thickness generally between 0.05 and 5 mm, which thus constitutes the external layer of the composite material. This external layer provides high protection against mechanical damage and against moisture penetration.

For certain specific uses, the composite material may comprise, between the metal layer and the polymer film layer, a resin layer intended to improve bonding and comprising, for example, a thermosetting resin such as an epoxide resin. The epoxide resin, which may be solid or liquid at ambient temperature, is then mixed with a hardening agent, such as, for example, an anhydride or polyaminoamide and, where appropriate, with a cross-linking catalyst, and is applied in the liquid state to the metal layer which is to be coated, the thickness applied advantageously being between 10 and 200 μm.

The process for obtaining said composite material comprises coating the polymer film onto a metal support, where appropriate carrying a resin layer to improve bonding, at a temperature of between 140° and 330° C., the speed of travel of the said metal support being between 1 and 400 meters per minute. The metal is, for example, aluminium (in which case the speed of travel is advantageously between 40 and 400 meters per minute) or steel (in the case of steel tubes the speed of travel is generally from 1 to 10 meters per minute). The metal support is in the form of a sheet, foil or tube and has a thickness of at least 25 μm. Coating is advantageously carried out by means of a flat die. Where the composite material comprises a layer of a film of a thermoplastic resin as the external layer, this film is advantageously formed by co-coating using a second flat die set back from the first die. The presence, in the polymers according to the invention, of units derived from a polyol polyacrylate or polymethacrylate makes it possible significantly to reduce the neck-in (as defined earlier) of the coated film.

The present invention will now be illustrated by the examples which follow and which do not imply any limitation.

I—PREPARATION OF THE POLYMERS

The polymerization installation under consideration comprises, arranged in series, a primary compressor, a secondary compressor, a reactor, a separator, a degassing hopper and an extruder from which the polymer formed is introduced into a granulation apparatus, the gases coming from the separator being recycled to the intake of the secondary compressor and those coming from the hopper being recycled to the intake of the primary compressor. In this installation the copolymerization is carried out under a pressure P (expressed in bars) and at a temperature T (expressed in °C.) of ethylene (A), maleic anhydride (B), alkyl acrylate or methacrylate (C) and polyol polyacrylate or polymethacrylate (D), in the proportions (parts by weight) shown in Table I below, is carried out in the presence of 0.03% by weight of 3,5,5-trimethylhexanoyl peroxide and of the amounts, expressed in % by volume in Table I, of 1-butene (Bu) as a transfer agent.

EXAMPLE 1 (COMPARATIVE EXAMPLE)

Ethyl acrylate was used as compound (C). Maleic anhydride was dissolved in an amount of 250 g/l in the ethyl acrylate and the solution was introduced directly into the reactor.

EXAMPLE 2

Trimethylolpropane triacrylate dissolved in an amount of 100 g/l in propylene carbonate and introduced directly into the reactor was used as compound (D). Methyl acrylate, introduced into the intake of the secondary compressor, was used as compound (C). Maleic anhydride, dissolved in an amount of 300 g/l in propylene carbonate, was introduced directly into the reactor.

EXAMPLE 3

Trimethylolpropane triacrylate was used as compound (D), dissolved in an amount of 100 g/l, together with maleic anhydride in an amount of 280 g/l, in ethyl acrylate. The solution was introduced directly into the reactor.

EXAMPLE 4

Tripropylene glycol diacrylate was used as compound (D), dissolved in an amount of 100 g/l, together with maleic anhydride in an amount of 280 g/l, in ethyl acrylate. The solution was introduced directly into the reactor.

EXAMPLE 5

Trimethylolpropane triacrylate was used as compound (D), dissolved together with maleic anhydride in n-butyl acrylate, in the same concentrations as in Example 4. The solution was introduced directly into the reactor.

EXAMPLE 6 (COMPARATIVE EXAMPLE)

n-Butyl acrylate was used as compound (C). Maleic anhydride was dissolved in an amount of 250 g/l in the said acrylate and the solution was introduced directly into the reactor.

EXAMPLE 7 (COMPARATIVE EXAMPLE)

Ethyl acrylate was used as compound (C). Maleic anhydride was dissolved in an amount of 315 g/l in said acrylate and the solution was introduced directly into the reactor.

EXAMPLE 8

Into a solution containing 400 g/l maleic anhydride in ethylacrylate, trimethylol propane triacrylate was added as compound (D) in an amount of 6% by weight. The solution was introduced directly into the reactor.

TABLE 1

| Example | (A) | (B) | (C) | (D) | Bu | P | T |
|---|---|---|---|---|---|---|---|
| 1 | 130 | 0.34 | 0.87 | 0.00 | 0.02 | 1650 | 200 |
| 2 | 120 | 0.38 | 1.20 | 0.10 | 0.02 | 1800 | 200 |
| 3 | 120 | 0.32 | 0.96 | 0.10 | 0.02 | 1450 | 200 |
| 4 | 120 | 0.34 | 0.90 | 0.06 | 0.01 | 1450 | 200 |
| 5 | 100 | 0.45 | 0.75 | 0.15 | 0.02 | 1600 | 210 |
| 6 | 100 | 0.45 | 0.75 | 0.00 | 0.02 | 1950 | 210 |
| 7 | 100 | 0.38 | 0.84 | 0.00 | 0 | 2000 | 200 |
| 8 | 100 | 0.62 | 0.86 | 0.10 | 0 | 1800 | 200 |

II—PROPERTIES OF THE POLYMERS OBTAINED

The molar contents of units (A), (B), (C) and (D), as well as the following parameters, are shown in Tables II and III.

MI: melt index measured in accordance with standard specification ASTM D-1238 at 190° C. under a load of 2.16 kg, and expressed in dg/min.

$MP_c$ crystalline melting point measured by differential enthalpy analysis and expressed in °C.

V: Vicat softening point measured in accordance with standard specification ASTM D-1525 and expressed in °C.

Mw: weight-average molecular weight.

Mw/Mn: polydispersity index.

DS: drawing strength (expressed in gf) at a rate of drawing of 3.14 m/min.

BS: breaking strength (expressed in gf) obtained by continuously increasing the drawing speed. Drawing strength and breaking strength are determined at 190° C. by means of a TOYOSEIKI elongational rheometer.

The mean molecular weights are measured by gel permeation chromatography.

The molar percentages of the various units constituting the polymers are measured by infrared spectroscopy, except for the units (D) which are determined by proton nuclear magnetic resonance.

TABLE II

| Example | (A) | (B) | (C) | (D) | MI | $MP_c$ | V | Mw | Mw/Mn |
|---|---|---|---|---|---|---|---|---|---|
| 1 | 96.62 | 0.88 | 2.50 | 0.00 | 6.4 | 104 | 78 | 84,000 | 6.5 |
| 2 | 96.39 | 0.88 | 2.70 | 0.03 | 3.4 | 104 | 75 | 92,000 | 9.0 |
| 3 | 96.44 | 0.88 | 2.60 | 0.08 | 6.3 | 104 | 75 | 93,000 | 11.3 |
| 4 | 96.42 | 0.94 | 2.60 | 0.04 | 4.4 | 104 | 75 | 105,000 | 11.4 |
| 5 | 97.62 | 1.00 | 1.30 | 0.08 | 7 | 107 | 85 | 86,000 | 5.3 |
| 6 | 97.18 | 1.06 | 1.75 | 0.00 | 7 | 107 | 82 | 82,000 | 4.5 |
| 7 | 97.69 | 0.94 | 1.36 | 0.00 | 1.1 | 109 | 87 | 99,000 | 5.1 |
| 8 | 97.33 | 1.23 | 1.30 | 0.13 | 1.3 | 110 | 86 | 139,000 | 9.1 |

III—APPLICATION TO THE COATING OF ALUMINUM

The polymers are melted at 280° C. and extruded by means of a flat die, 500 mm wide and with an 0.6 mm gap. A 37 μm thick aluminium foil is coated, at a drawing speed of 100 m/min, so as to cover it with 35 g of polymer per m².

The values of the neck-in (defined above and expressed in %) are shown in Table III below.

TABLE III

| Example | 1 | 2 | 3 | 4 | 5 | 6 |
|---|---|---|---|---|---|---|
| DS | 2.2 | 6.75 | 3.4 | 4.6 | 1.7 | 1.2 |
| BS | 2.6 | 6.4 | 3.9 | 5.0 | 2.5 | 2.0 |
| neck-in | 20 | nd | 16 | 16 | 16 | 24 | nd: not determined

We claim:

1. Polymers of melt index between 1 and 20 dg/min, which comprise:
   - 83 to 98.7 moles of units (A) derived from ethylene,
   - 0.29 to 3 moles of units (B) derived from an ethylenically unsaturated α,β-dicarboxylic acid anhydride,
   - 1 to 13.6 moles of units (C) derived from an alkyl acrylate or methacrylate in which the alkyl group contains from 1 to 12 carbon atoms, and
   - 0.01 to 0.4 moles of units (D) derived from at least one polyol polyacrylate or polymethacrylate, the moles of units (A) to (D) being per 100 moles.

2. Polymers according to claim 1, wherein the polyol polyacrylate or polymethacrylate is trimethylolpropane triacrylate.

3. Polymers according to claim 1, wherein the polyol polyacrylate or polymethacrylate is tripropylene glycol diacrylate.

4. Polymers according to claim 1 wherein their melt index is between 1 and 8 dg/min.

5. Polymers according to claim 1, wherein their polydispersity index is between 5 and 12.

6. The polymers of claim 1, wherein said polymers are thermoplastic.

* * * * *